Patented June 28, 1938

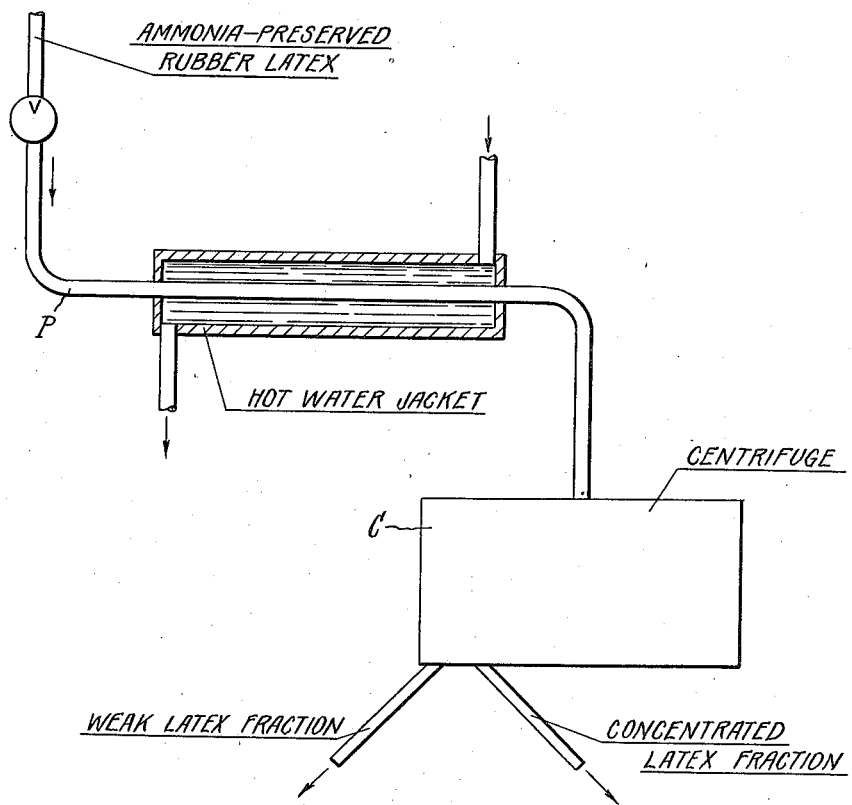

2,122,232

UNITED STATES PATENT OFFICE 2,122,232

CENTRIFUGAL CONCENTRATION OF RUBBER LATEX OR THE LIKE

James B. Crockett, Malden, Mass., assignor to Heveatex Corporation, Melrose, Mass., a corporation of Massachusetts Application May 8, 1934, Serial No. 724,624

2 Claims. (Cl. 18—50)

This invention relates to the centrifugal concentration of rubber latex or similar aqueous rubber dispersion for the purpose of resolving it into a concentrated fraction and a weaker fraction.

In making various products, such as so-called dipped rubber goods, directly from rubber latex, it is sometimes desirable to work with rubber latex of higher solids content than that naturally occurring in the latex. Thus, whereas normal rubber latex has a solids content of about 35% to 40%, it may be desirable that the solids present therein amount to, say, about 60%, or even more. The concentration of rubber latex to such higher solids content can be effected by centrifugation, according to which practice the rubber latex is progressively delivered as a stream into a DeLaval or similar centrifugal machine equipped with a drum on whose internal wall annular layers of two latex fractions are progressively built up. The weaker fraction, which occurs next to the wall, and the concentrated fraction are progressively drawn off in the form of separate or independent streams from the sphere of centrifugal action as they are being produced. I need not dwell further upon the construction or mode of operation of this form of machine, which is well known to those skilled in the art and which constitutes no part of the present invention. In practicing such a method, it is obviously desirable to produce from a given volume of latex fed into the machine the maximum movement of solids into the concentrated fraction, thereby leaving a minimum amount of solids in the weaker fraction. In other words, the most important consideration from a practical standpoint is that the volumetric ratio of the concentrated fraction to the weaker fraction and the volumetric ratio of the concentrated fraction to the latex used as raw material (throughput) be as high as possible for a given machine.

I have discovered that by heating latex before it is subjected to centrifugal concentration as hereinbefore described, it is possible to increase markedly the volumetric ratio hereinbefore mentioned, and further that the higher the temperature to which the latex is heated before centrifugal concentration, the greater this ratio becomes. I have observed, however, that it is undesirable to heat the latex to a temperature higher than about 140° F., since at higher temperature a substantial skin of rubber tends to develop on the surface of the resulting concentrated fraction particularly when it is allowed to cool by mere exposure to the prevailing room temperature. The rubber skin represents latex that has been coagulated and so must be removed and put to uses wherein its value in term of dollars and cents is less than when it is kept in the form of latex. While it is possible to minimize skin formation by rapidly cooling the concentrate, it is preferable to operate with latex that has been heated to temperatures not in excess of about 140° F., for by keeping below this upper temperature limit skin formation is low or virtually negligible even when the concentrate is permitted to cool by mere exposure to prevailing room temperature. By heating latex in accordance with my invention to a temperature ranging from about 90° to 140° F., it is possible by centrifugal concentration or fractionation to recover from latex of normal solids content a concentrated fraction whose volume is at least about half of the volume of the original latex and whose solids content is at least about 60%. These results are not otherwise obtainable. For instance, if the temperature of the latex being put through the treatment is, say, 60° F., or lower, it is possible to realize a concentrated fraction of about 60% solids content in volume amounting to only about one-quarter of the volume of the original latex. It is thus seen that by heating latex in accordance with my invention, it is possible to increase greatly the volume of concentrated latex producible from a given volume of normal latex, in consequence of which not only is the output of concentrated latex per unit of time by a given machine greatly increased, but there is in the production of a given volume of concentrated latex less weaker-than-normal latex to dispose of, less running of and wear and tear on the machine, and lower labor costs. The following results are typical of those realized by heating normal latex in accordance with my invention to various temperatures falling within the temperature range hereinbefore given and putting it through a typical commercial DeLaval centrifugal machine:—

Table I

| Temperature in degrees F. | Throughput (T) in gallons per hour | 60% concentrate (C) | Ratio C/T |
|---|---|---|---|
| 105 | 120 | 63 | .525 |
| 110 | 131 | 76 | .580 |
| 120 | 107 | 63 | .581 |
| 125 | 142 | 83 | .584 |

Table II

| 105 | 182 | 93 | .510 |
| 122 | 218 | 118 | .541 |
| 129 | 194 | 106 | .546 |

It is to be observed that at different rates of throughput, various volumes of concentrated latex were realized, but that in all cases, the ratio of concentrated latex to throughput increased with an increase in the temperature of the latex.

Taking into consideration tendency toward skin formation and recovery of concentrated latex, I prefer to operate at about 100° to 110° F., as at these temperatures the tendency toward skin formation is low and a high recovery of concentrated latex is attained. I may, however, operate to advantage at other temperatures within the range hereinbefore given.

Some logical explanation for the results secured by the practice of my invention has been sought. The following mathematical expression would appear to represent the influences at play upon the particles of a suspension, like rubber latex, undergoing centrifugal concentration:—

$$V = \frac{F}{6nr}$$

In this formula, V equals the velocity of separation of the suspended particles of rubber; F is equal to the force applied; $r$ the radius of the particles; and $n$ the viscosity of the medium in which the particles are suspended. A particular application of the above formula, known as Stokes' Law, is as follows:—

$$V = \frac{2gr^2(d_1 - d_2)}{9n}$$

in which V, $r$ and $n$ have the same significance as above; $g$ represents the uniform acceleration due to the force applied (in this case the centrifugal force); $d_1$ the density of the particles; and $d_2$ the density of the liquid medium. It will be observed that the rate at which the particles of rubber are separated, or, in other words, the rate of concentration of the latex, depends primarily on two factors;—the difference between the densities of the particles themselves and the aqueous medium; and the viscosity. Viscosity may be represented by the following expression:—

$$n = \frac{\pi d_2 g r^4 t}{8Q(L+K)}\left(h - \frac{mv^2}{g}\right)$$

an expression used in the determination of viscosity by a flow of a viscous liquid under nearly constant head through a tube of radius $r$, length L, and time $t$. In the present consideration, the only factor of interest is the value $d_2$, which represents the density of the liquid, wherefore, it is apparent that viscosity is directly dependent on the density. I then have this value $d_2$ as a secondary variable affecting the velocity of separation of the particles from the suspended medium.

If I now consider the effect of each of these variables, I arrive at an understanding of the temperature effect in the centrifugal treatment of latex. Increase of temperature results in a decrease of both $d_1$ and $d_2$. No accurate data as to the actual change of density of the rubber particles with temperature is available, but De Vries is authority for the statement that the change in density per degree C. in 18% latex is 0.003; in 40% latex, 0.0046. The change in the more concentrated latex is evidently greater, on account of the increased number of rubber particles present therein. Whether the value of $(d_1 - d_2)$ increases or decreases with increase of temperature, the magnitude of this change is small in comparison with the other factors involved. The other factor, viscosity, which is in turn directly dependent on the density of the liquid medium, is of more importance in determining the rate of concentration than any other factor. Determinations of the viscosity of latex at various concentrations have been made and it has been found that there is a very marked drop in viscosity with increase of temperature more particularly to within that range of temperature whereat I have discovered it advantageous to perform the centrifugal concentration of latex. As was noted above, the density of the liquid medium changes faster than the value $(d_1 - d_2)$; and, as this value, $d_2$, is also a determining factor in viscosity, the magnitude of the viscosity is evidently the determining factor in the velocity of separation of the particles or rate of concentration. Whether this explanation of the actual mechanism of the temperature effect is correct or not, the actual results obtainable by centrifugally concentrating rubber latex at elevated temperatures in accordance with our invention is of great practical importance, as has already appeared.

The rubber latex subjected to concentration in accordance with my invention is the usual ammonia-preserved rubber latex as it comes from the rubber plantations in the Far East or in the other rubber-producing regions. Inasmuch as keeping the latex heated for a considerable period of time would result in the loss of considerable ammonia, particularly when the latex is heated to temperatures near the upper limit (about 140° F.) of the temperature range hereinbefore given, it is preferable to heat the latex only immediately before it enters the sphere of centrifugal action, as illustrated diagrammatically on the accompanying drawing. Thus, the stream of latex may be delivered from a suitable source of supply through a pipe P which, as illustrated, is jacketed with hot water or other suitable heating medium which heats the latex indirectly to the desired elevated temperature just before it enters the centrifugal machine C. In this way, it is possible to minimize loss of ammonia as the two latex fractions withdrawn from the machine can be put promptly into the hermetically sealed drums in which latex is ordinarily stored and shipped and in which the temperature of the surrounding atmosphere is soon acquired thereby.

I claim:—

1. A method of resolving ammonia-preserved rubber latex into a concentrated fraction and a weaker fraction, which comprises continuously flowing said latex in the form of a stream through a conduit into a sphere of centrifugation, indirectly heating said stream of latex to a temperature of about 90° to 140° F. as it flows through said conduit and immediately prior to the entry of said stream into said sphere of centrifugation, and continuously and separately withdrawing a concentrated latex fraction and a weaker latex fraction from said sphere of centrifugation.

2. A method of resolving ammonia-preserved rubber latex into a concentrated fraction and a weaker fraction, which comprises continuously flowing said latex in the form of a stream through a conduit into a sphere of centrifugation, indirectly heating said stream of latex to a temperature of about 100° to 110° F. as it flows through said conduit and immediately prior to the entry of said stream into said sphere of centrifugation, and continuously and separately withdrawing a concentrated latex fraction and a weaker latex fraction from said sphere of centrifugation.

JAMES B. CROCKETT.